(12) United States Patent
Igor' Valer'Evich

(10) Patent No.: US 9,883,112 B1
(45) Date of Patent: Jan. 30, 2018

(54) HIGH DYNAMIC RANGE IMAGING

(71) Applicant: PINNACLE IMAGING CORPORATION, Belmont, CA (US)

(72) Inventor: Vanjushin Igor' Valer'Evich, Zelenograd (RU)

(73) Assignee: Pinnacle Imaging Corporation, Belmont, CA (US)

( * ) Notice: Subject to any disclaimer, the term of this patent is extended or adjusted under 35 U.S.C. 154(b) by 0 days.

(21) Appl. No.: 15/272,904

(22) Filed: Sep. 22, 2016

(51) Int. Cl.
| | | |
|---|---|---|
| H04N 5/235 | (2006.01) | |
| H04N 9/76 | (2006.01) | |
| H04N 5/232 | (2006.01) | |
| H04N 5/04 | (2006.01) | |

(52) U.S. Cl.
CPC .......... *H04N 5/2352* (2013.01); *H04N 5/04* (2013.01); *H04N 5/23245* (2013.01); *H04N 9/76* (2013.01)

(58) Field of Classification Search
CPC .... H04N 5/35536; H04N 5/2352; H04N 5/04; H04N 5/23245; H04N 5/2355; H04N 5/23232; H04N 5/355; H04N 5/235; H04N 9/76; G06T 5/50
USPC ........................................................ 348/235
See application file for complete search history.

(56) References Cited

U.S. PATENT DOCUMENTS

| | | | | |
|---|---|---|---|---|
| 8,391,598 B2* | 3/2013 | Lin | .......... | G06T 5/008 382/162 |
| 8,933,985 B1* | 1/2015 | Rapaport | .......... | G06T 3/4038 348/36 |
| 9,628,704 B2* | 4/2017 | Campbell | .......... | H04N 5/23229 |
| 9,686,493 B2* | 6/2017 | Campbell | .......... | H04N 5/378 |
| 2010/0271512 A1* | 10/2010 | Garten | .......... | G09G 5/06 348/239 |
| 2011/0211732 A1* | 9/2011 | Rapaport | .......... | G06F 3/1454 382/107 |
| 2011/0254976 A1* | 10/2011 | Garten | .......... | G06F 3/1454 348/229.1 |
| 2012/0170843 A1* | 7/2012 | Lin | .......... | G06T 5/008 382/167 |
| 2012/0188392 A1* | 7/2012 | Smith | .......... | H04N 5/2355 348/222.1 |
| 2012/0218442 A1* | 8/2012 | Jandhyala | .......... | G06T 5/50 348/239 |
| 2012/0274822 A1* | 11/2012 | Smith | .......... | H04N 5/23254 348/302 |
| 2015/0078661 A1* | 3/2015 | Granados | .......... | G06T 5/009 382/167 |
| 2015/0170389 A1* | 6/2015 | Ming | .......... | G06K 9/00684 382/284 |

(Continued)

*Primary Examiner* — Pritham Prabhakher
(74) *Attorney, Agent, or Firm* — Rosenberg, Klein & Lee

(57) ABSTRACT

A high dynamic range video processing method performs merging and tone mapping techniques after a Bayer filter mosaic technique is performed and then converts it to red green blue (RGB) at the end as opposed to converting into RGB at the beginning and then performing merging and tone mapping after. The HDR processing is performed on Bayer-mosaic images and no de-mosaicing and color space conversions are required. The merging procedure has two modes: full-reset merging and LDR-updated merging. The first mode, full-reset merging, creates an HDR frame once the system has all image frames captured. The second mode, LDR-updating merging, means that any new HDR frame is obtained by an updating of a previous HDR frame with a new LDR frame data.

2 Claims, 9 Drawing Sheets

(56) References Cited

U.S. PATENT DOCUMENTS

2015/0245044 A1* 8/2015 Guo ................ H04N 21/42202
  375/240.03
2016/0150145 A1* 5/2016 Van Der Vleuten . H04N 5/2355
  348/234

* cited by examiner

HIGH DYNAMIC RANGE IMAGING

BACKGROUND OF THE INVENTION

Field of the Invention

The present invention relates to digital imaging. More specifically, the present invention discloses a method and device for high dynamic range video processing that processes a smaller stream of data to achieve a high frame rate.

Description of the Prior Art

High dynamic range imaging is used to reproduce a greater dynamic range of luminosity in imaging and photography.

A conventional technique of high dynamic range imaging includes utilizing special image sensors for oversampling. Another technique involves merging multiple images.

However, the special image sensors often encounter difficulty when used in low light conditions which produces a non-optimal resultant image.

Additionally, digital image encoding does not always offer a great enough range of values to allow fine transitions which causes undesirable effects due to lossy compression.

Therefore, there is need for an efficient method and device for high dynamic range video processing that produces superior high dynamic range video images at a high frame rate.

SUMMARY OF THE INVENTION

To achieve these and other advantages and in order to overcome the disadvantages of the conventional method in accordance with the purpose of the invention as embodied and broadly described herein, the present invention provides an efficient method and device for ultra high dynamic range video processing that produces superior high dynamic range video images at a high frame rate.

The present invention provides a hardware realization of improved ultra high dynamic range (HDR) technology. The present invention processes, merges, and tone maps multiple exposures in a video form using a field programmable gate array (FPGA) platform.

The method provides a unique way to perform the merge and tone mapping techniques after a Bayer filter mosaic technique is performed and then convert it to red green blue (RGB) at the end as opposed to converting into RGB at the beginning and then performing merging and tone mapping after. In this way the present invention has a significantly smaller stream of data being processed which allows for achieving higher frame rates.

The linear primary Bayer mosaic signals are converted directly to a logarithmic scale pixel-wise. Some color balance pre-compensation can be used before the conversion. In this way, each R, G1, G2, or B pixel is being converted to its logarithmic value independently. Then the pixels are processed and the HDR result is converted from the log-scale back to the primary linear Bayer mosaic. This helps to insert the processing between an image sensor and a commonly used image processor.

The ultra high dynamic range imaging of the present invention allows a throughout compatibility for all 3 main stages: merging, tone mapping, and compression.

Additionally, the present invention preserves both the details and colors of the captured HDR scene.

Furthermore, in the present invention, the resulting images look as natural as possible within the capabilities of the capturing and reproduction devices.

The HDR processing of the present invention is performed on Bayer-mosaic images (RAW data from an image sensor). No de-mosaicing and color space conversions are required to perform merging and tone mapping operations. This allows for saving processing resources and decreasing color losses.

All HDR processing operations are performed in a logarithmic scale to meet human eye vision aspects. This method significantly simplifies calculations.

For merging operations, N image frames (of different exposures) are used per HDR capture.

The merging procedure has two modes: full-reset merging and LDR-updated merging. The first mode, full-reset merging, creates an HDR frame once the system has all N frames captured. The second mode, LDR-updating merging, means that any new HDR frame is obtained by an updating of a previous HDR frame with a new LDR (low dynamic range) frame data. Thus, the HDR frames are updated by LDR (low dynamic range) frames at a frame rate of LDR frames.

For example: LDR frames come at 120 fps, then the first mode gives 30 fps for HDR images, the second mode gives 120 fps for HDR images.

For some FPGA designs, a 16-bit operation limits the HDR range to 16EV (exposure value). But even this allows for covering all the exposure range settings of an image sensor and the exposure time can be controlled via a timing of the sensor only.

Additionally, the output HDR image is a Bayer-mosaiced HDR image.

Locally-adaptive tone mapping performs a brightness range compression in a human-eye comfortable manner. The tone mapping is human-eye oriented. In other words, the present invention tone maps the images with the use of an artist painting approach.

Color chromaticity is preserved during the tone mapping process. Color distortions are minimal, depending on the Bayer mosaic type and optical properties of the lens sensor system. This is provided by the ability to tone map Bayer-mosaiced images in primary sensor colors (without a color-space conversion and de-mosaicing).

For example, the present invention can compress the HDR brightness range from 96 dB to 8-bit per pixel output and the output HDR image is a Bayer-mosaiced tone mapped HDR image.

When using 32-bit processing, the merging can give up to 32EV HDR images depending on the image sensor.

The tone mapping can compress from 192 dB, with the use of locally adaptive calculations, to 8-bit images.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
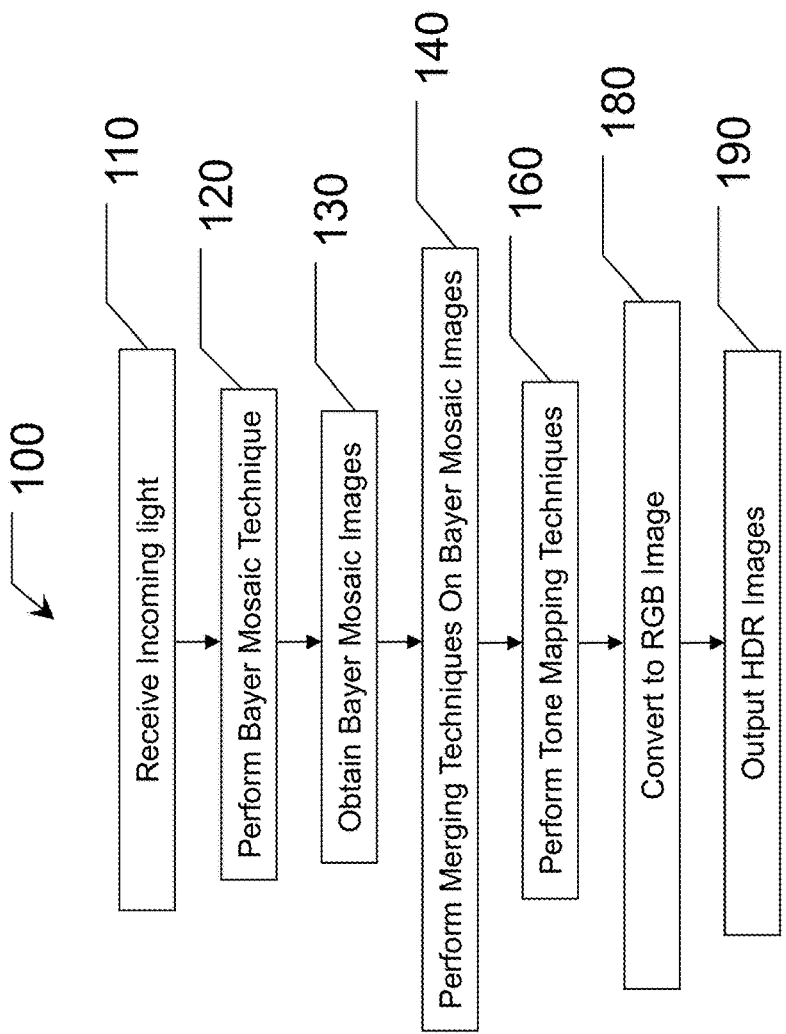
FIG. 1A is a flowchart illustrating a method for high dynamic resolution video processing according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Figure 1B:
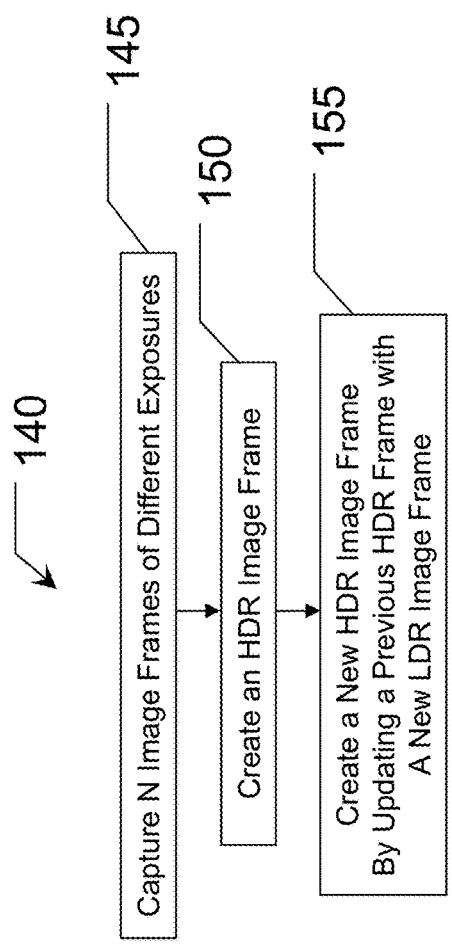
FIG. 1B is a flowchart illustrating merging techniques for high dynamic resolution video processing according to an embodiment of the present invention.

Refer to FIG. 1A, which is a flowchart illustrating a method for high dynamic resolution video processing and to FIG. 1B, which is a flowchart illustrating merging techniques for high dynamic resolution video processing.

As shown in FIG. 1A the high dynamic resolution video processing method 100 of the present invention begins in Step 110 by receiving incoming light. The light passes through a Bayer filter in Step 120 and is captured by an image capture device such as, for example, a sensor array in Step 130.

The RAW data from the image capture device is provided to a HDR processor module for processing. In Step 140 merging techniques are performed on the RAW data and in Step 160 tone mapping techniques are performed.

In Step 180 the merged-tone mapped data is converted to RGB and the HDR image is output in Step 190.

The HDR video processing method 100 of the present invention provides a unique way to perform the merge and tone mapping techniques after a Bayer filter mosaic technique is performed and then convert it to red green blue (RGB) at the end as opposed to converting into RGB at the beginning and then performing merging and tone mapping after. In this way the present invention has a significantly smaller stream of data being processed which allows for achieving higher frame rates.

The HDR processing of the present invention is performed on Bayer-mosaic images (RAW data from an image sensor). No de-mosaicing and color space conversions are required to perform merging and tone mapping operations. This allows for saving processing resources and decreasing color losses.

All HDR processing operations are performed in a logarithmic scale to meet human eye vision aspects. This method significantly simplifies calculations.

For merging operations, N image frames (of different exposures) are used per HDR capture. The method supports any amount of frames of different exposures to be merged.

The merging procedure (Step 140) has two modes: full-reset merging and LDR-updated merging. The first mode (Steps 145, 150 FIG. 1B), full-reset merging, creates an HDR frame once the system has all image frames captured. The second mode (Step 155 FIG. 1B) LDR-updating merging, means that any new HDR frame is obtained by an updating of a previous HDR frame with a new LDR (low dynamic range) frame data. Thus, the HDR frames are updated by LDR (low dynamic range) frames at a frame rate of LDR frames.

For example: LDR frames come at 120 fps, then the first mode gives 30 fps for HDR images, the second mode gives 120 fps for HDR images.

For some FPGA designs, a 16-bit operation limits the HDR range to 16EV (exposure value). But even this allows for covering all the exposure range settings of an image sensor and the exposure time can be controlled via a timing of the sensor only.

Additionally, the output HDR image is a Bayer-mosaiced HDR image.

Locally-adaptive tone mapping performs a brightness range compression in a human-eye comfortable manner. The tone mapping is human-eye oriented. In other words, the present invention tone maps the images with the use of an artist painting approach.

Color chromaticity is preserved during the tone mapping process. Color distortions are minimal, depending on the Bayer mosaic type and optical properties of the lens sensor system. This is provided by the ability to tone map Bayer-mosaiced images in primary sensor colors (without a color-space conversion and de-mosaicing).

For example, the present invention can compress the HDR brightness range from 96 dB to 8-bit per pixel output and the output HDR image is a Bayer-mosaiced tone mapped HDR image.

When using 32-bit processing, the merging can give up to 32EV HDR images depending on the image sensor.

The tone mapping can compress from 192 dB, with the use of additional edge-processing calculations, to 8-bit images.

Figure 1C:
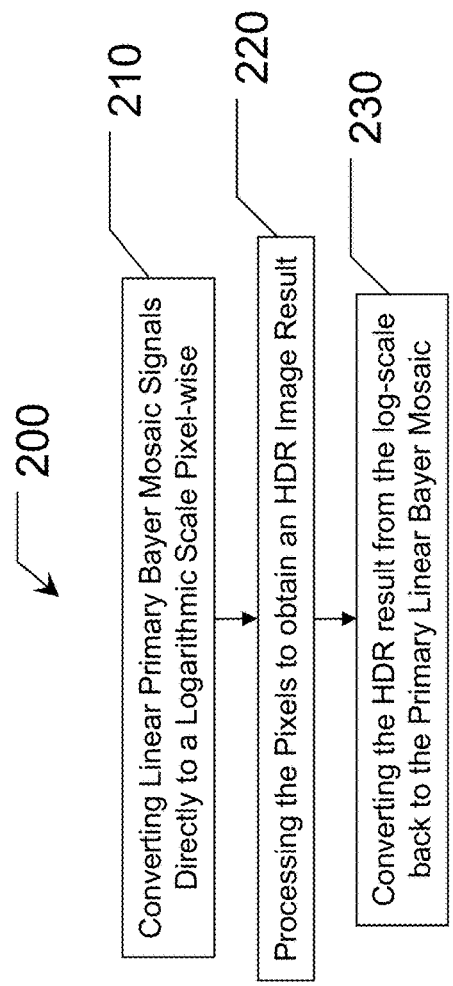
FIG. 1C is a flowchart illustrating a method for high dynamic resolution video processing according to an embodiment of the present invention.

Refer to FIG. 1C, which is a flowchart illustrating a method for high dynamic resolution video processing according to an embodiment of the present invention.

The high dynamic resolution processing method 200 comprises converting linear primary Bayer mosaic signals directly to a logarithmic scale pixel-wise in Step 210. In this way, each R, G1, G2, or B pixel is converted to its logarithmic value independently. In Step 220, the pixels are processed to obtain a high dynamic range result. And in Step 230, the high dynamic range result is converted from the logarithmic scale back to the primary linear Bayer mosaic.

Figure 2:
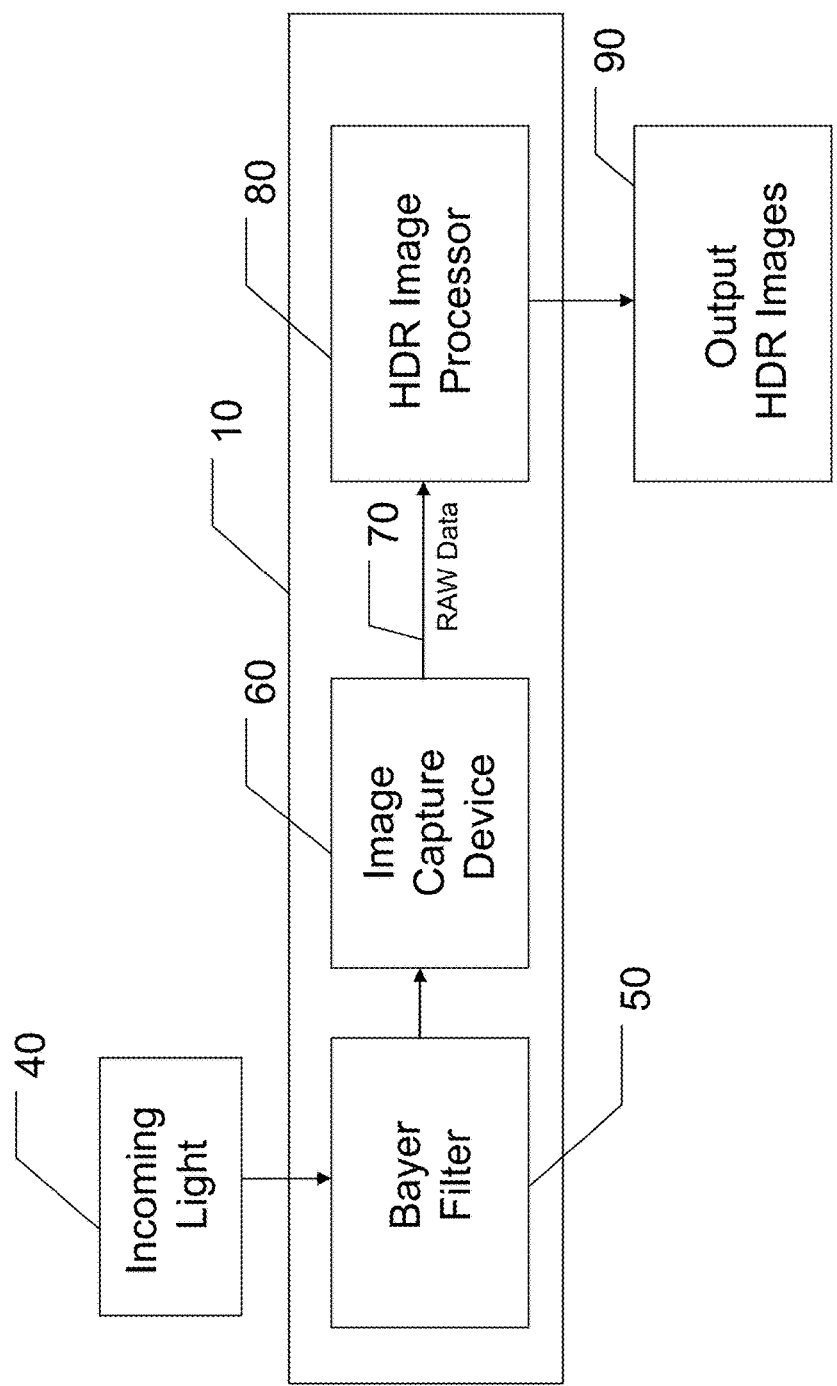
FIG. 2 is a drawing illustrating a device for high dynamic resolution video processing according to an embodiment of the present invention.

Refer to FIG. 2, which is a drawing illustrating a device for high dynamic resolution video processing according to an embodiment of the present invention.

The high dynamic resolution video processing device 10 of the present invention comprises a Bayer filter 50, an image capture device 60, and an HDR processor or HDR processing module 80.

In an embodiment of the present invention the Bayer filter 50 and the image capture device 60 are separate devices from the HDR processor 80. In another embodiment of the present invention the image capture device 60 is integrated with the HDR processor 80.

In an embodiment of the present invention the HDR processor 80 comprises a field programmable gate array (FPGA).

In operation, light 40 is received by the HDR video processing device 10. The light 40 passes through a Bayer filter 50 and is captured by an image capture device 60 such as, for example, a sensor array.

The RAW data 70 from the image capture device 60 is provided to the HDR processor module 80 for processing. The HDR processor module 80 performs merging techniques on the RAW data and tone mapping techniques.

The merged-tone mapped data is then converted to RGB and the HDR image 190 is output.

Basic requirements for high dynamic range imaging (HDRI) are targeted to achieve human eye abilities in terms of the dynamic range: once a human eye observes all the highlights and shadows of the perceptible scene, then the HDRI system should be able to save and reproduce the same visual data. This means, that the HDRI system should work at an absolute exposure range of 42 . . . 46 EV stops (human eye absolute range), or at least be locally adapted at the exposure range of 22 . . . 24 EV stops (human eye common viewable range).

In most cases, dynamic ranges of image sensors are not sufficient, varying from 8 EV stops (for low-cost cameras) to ~14 EV stops (for hi-end cameras). In order to extend a dynamic range of images, an exposure bracketing is applied; a set of LDR images (brackets) taken with different exposure settings are being produced for the same scene. Brackets can include different settings for exposure time, gain (or ISO speed) and aperture. Then, a merging procedure is applied to the set of LDR images in order to obtain a final HDR image. The merging quality depends on the bracketing method used.

In exposure time bracketing, different LDR images are taken with different exposure time settings. A whole image should be readout from an image sensor for each bracket. This method gives the biggest possible dynamic range for the given sensor usage, because all the range of exposure time setting can be used.

In gain (or ISO speed) bracketing, different LDR images are taken with different Gain settings. In such a method the image is being taken just once, and then it is being kept in an analog buffer of the image sensor. Brackets are formed by a multi-readout process of the image from the analog buffer using different gains for different frames readout. The merging procedure does not require a de-ghosting correction since there are no motions between the frames readouts.

Aperture bracketing requires a mechanical aperture operation. The aperture is being changed for each bracket, thus defining a light flux range to be captured within the given exposure time. This kind of bracketing can be applied at a constant exposure time and a constant gain, so the brackets (contrary to other brackets types) have the same SNR (signal-to-noise ratio). This makes the exposure time as big as possible and helps to achieve the best possible SNR for the given sensor.

A combination of bracketing types is used to achieve better SNR or fewer of ghost artifacts.

For HDR images of 24 EV range the data size is 4 times bigger, than that for "regular" 8-bit LDR images. Good compression techniques with minimized color losses are utilized to save the HDR images or transmit them via communication protocols.

Widely used reproduction devices, such as monitors/displays or printers, do not have more than 8 . . . 12 EV stops of DR. In order to reproduce HDR images (with a DR higher than 8 . . . 12 EV) on these devices, a tone mapping (TM) procedure is performed in order to map all brightness values (of all pixels in the image) into a target DR of the device. This is also known as dynamic range compression.

Tone mapping is a complicated and sophisticated procedure. With tone mapping all highlights and shadows of an HDR image should be seen on the LDR reproduction device (global contrast modification), the visual contrast of the image's details should not be lost (local contrast modification), and the colors of the details (chromaticity) should not be changed (or color losses should be minimized).

The following details some challenges with tone mapping techniques.

Any image (LDR or HDR) is represented through its pixels, denoted as $l=l(x,y)$, where:

Symbol l represents one of the pixels color components $l=\{q_0, \ldots, q_n\}$ in the given color domain (for example, $l=\{R, G, B\}$, or $l=\{L, u, v\}$)

Values (x,y) represent spatial coordinates of the pixel in the image.

There are different tone-mapping techniques, which can be divided into simple "pixel-wise" TM and TM with details "preservation".

For simple "pixel-wise" TM, a predefined tone-mapping curve T(l) is used for any pixel (the curve is common for all pixels). In this case no image details (bigger than 1×1 pixel) are taken into account; a value $l=l(x,y)$ of a pixel is being mapped through the curve to get a new value $l_{TM}=l_{TM}(x,y)$ for the pixel in the final tone-mapped image as:

$$l_{TM}=T(l)$$

An advantage of simple "pixel-wise" tone mapping is that the implementation is rather simple and it allows embedding the TM-curve functionality into an image sensor as "on-chip" solution. However, contrast losses occur for details, when the HDR image is of DR>10 EV, because the transfer function (which is the same for all pixels in the image) "knows nothing" about the image details: the predefined TM curve will not match some detail's brightness range.

In addition to the TM-curve mentioned above, in TM with details "preservation" spatial frequencies are being analyzed in an HDR image to preserve the image details. In this case the image is divided into two layers: High-frequency layer $l_{HF}=l_{HF}(x,y)$ for details and Low-frequency layer $l_{LF}=l_{LF}(x,y)$ for other data. This pixel-wise layers separation looks like:

$$l=l_{HF}+l_{LF} \tag{2.1}$$

The $l_{HF}$ is obtained via high-pass filtering of the image i (using, for example, a Fourier transform), while the $l_{LF}$ is calculated from (1) by using the image i and the $l_{HF}$ layer as:

$$l_{LF}=l-l_{HF}$$

The approach (1) can be interpreted as an equivalent separation of incident light energy in terms of spatial distribution of the energy over the sensor's pixels.

Global Contrast: the $l_{LF}$ is being modified (usually, by a Gamma-like TM-function) to map the required HDR range into the target monitor range:

$$l_{LF}^{TM}=T(l_{LF}) \tag{2.1.1}$$

Local Contrast: the $dT(l_{LF})/dl_{LF}$ is being additionally modified at certain ranges of $l_{LF}$. So, for these ranges the contrast can be made lower or higher.

Details contrast, or micro-contrast: the $l_{HF}$ is being modified in terms of its amplitude; usually it is modified by some amplitude factor A:

$$l_{HF}^{TM} = A > l_{HF} \quad (2.1.2)$$

Then, the operation (1) is used to get the tone-mapped image:

$$l^{TM} = l_{HF}^{TM} + l_{LF}^{TM} \quad (2.2)$$

Known results of the calculations (2) produce "unnaturally looking" images, because the contrast operations above are being performed in the linear energy-to-digit scale, but the human eye perceives the contrast in a logarithmic manner. In addition, the Fourier transform can be too calculative, for example, for video applications. That's why, in order to make the tone mapping "more natural" and to increase the performance of the HDRI system, the tone-mapping uses a logarithmic representation of the layers l, $l_{HF}$, $l_{LF}$.

$$B = \log l, B_{HF} = \log l_{HF}, B_{LF} = \log l_{LF},$$

Where l is a logarithm base, which is usually equal to 2 (known as EV scale), so 2×-change of the l relates to 1 EV "stop".

In this case, the pixel-wise layers separation is more similar to the human eye vision system:

$$B = B_{HF} + B_{LF} \quad (2.3)$$

In accordance with the human eye operation, the $B_{LF}$ is being calculated from B by an application of a low-pass filtering L(B|r) with a Gaussian 2D-filter (kernel) of a given standard deviation r:

$$B_{LF} = L(B|r)$$

The parameter r is also known here as an "effective radius" of the filter.

Then the $B_{HF}$ is calculated from (3) as:

$$B_{HF} = B - B_{LF}$$

The pixel-wise tone mapping operation here is similar to (2), but in a logarithmic scale:

$$B^{TM} = A > B_{HF} + T(B_{LF}) \quad (2.4)$$

Layers $B_{HF}$ and $B_{LF}$ are also known as local contrast layer $B^L$ and global contrast layer $B^G$ accordingly $$B^L = B_{HF}, B^G = B_{LF} \quad (2.5)$$

This approach is closer to human eye vision properties, thus it can potentially produce better results in a perception of the HDR tone-mapped image. However, the operation (2.4) just approximates the human vision system; it actually works for small details of 4 degrees viewing angle, so, when the approach (2.4) is used, the image quality depends on the distance of the image observation (a distance from a human eye to a displaying device, where the image is reproduced); thus, the distance of the image observation depends on the given parameter r of the Gaussian filtering. Also, the details contrast cannot be efficiently adjusted for different spatial frequencies, since a single r is used; bigger r values lead to noticeable "halo" for high-contrast edges in the image. Additionally, the A factor should not be constant, because, for example, "halos" can be unnoticeable for a group of details, but can appear for a single detail on a homogeneous bright field of the image.

Ideally, an electrical signal from a pixel can be represented as a signal proportional to some amount of incident light energy with a spectral distribution $s(\lambda)$ coming through an optical aperture f and detected within the pixel's area of an effective spectral sensitivity $p(\lambda)$ during a time period $\tau$ ("exposure time"), so the pixel's measured value is:

$$I = A \frac{\alpha \tau}{f^2} \int_0^\infty p(\lambda) s(\lambda) d\lambda$$

where A is a proportionality constant; $\alpha$ is any amplification gain (i.e. analog, digital).

Note:

$$P_s = A \int_0^\infty p(\lambda) s(\lambda) d\lambda$$

as a color component value (depends on the pixel's effective spectral sensitivity $p(\lambda)$/"primary color filter"/and an incident light spectrum $s(\lambda)$), and:

$$\varepsilon = \frac{\alpha \tau}{f^2}$$

as a camera exposure factor (depends on the camera exposure settings).

Then, $$l_P = \varepsilon P_l \quad (3.1)$$

In most cases, only $\varepsilon$ exposure factor can be controlled through camera settings, while $P_s$ can partially depend on uncontrolled dynamically changed illumination conditions of a captured scene: for example, environment light conditions along with artificial lights (like flashlights).

An exposure change factor is introduced:

$$\beta = \beta_C \beta_E \beta_S \quad (3.2)$$

where:

$$\beta_\varepsilon = \frac{\varepsilon_2}{\varepsilon_1}$$

is a camera exposure change factor, $$\beta_s = \frac{P_{s2}}{P_{s1}}$$

is an exposure change factor related to a scene illumination change, $\beta_s$—intended for a post-processing exposure correction.

Each $\beta$ value can be defined through a bracketing sequence.

From (3.1) and (3.2), the exposure change produces a change in the pixel's value:

$$l_p^{new} = \beta l_p \quad (3.3)$$

As a particular case, the exposure change can be performed at a certain pixel within an image sensor.

The equation (3.3) is true for an ideal sensor. But any transfer function of any image sensor is nonlinear. Even if the transfer function's working range is linear as (1), it has at least two saturation levels:

$l = l_p^{max}$ refers to a highest value (camera saturation level) for the given sensor's (camera) transfer function. For example, for 8 bits per pixel (LDR) $l_p^{max}=255$; for N bits per pixel (N>8, HDR) $l_p^{max}=2^N-1$.

l=0 refers to a lowest saturation level for the given sensor's transfer function, when the incident light energy is below a minimal detectable value for the sensor.

In the present invention a logarithmic scale is used for the pixels' values representation:

$$B_p = \log_t l_p$$

Saturation levels of a transfer function will limit the $B_p$ range too, so the range of the pixel's values in B representation (B-scale) is:

$$B \in [-\infty, B_p^{max}], \text{ where } B_p^{max} = \log_t l_p^{max}.$$

The B values are renormalized into "decibel"-like values, where the maximal value (or "white" point) is equal to zero:

$$b_p = B_p - B_p^{max} \quad (3.4)$$

where:

$$b_p \in [-\infty, 0]$$

The $B_p^{max}$ depends on the camera system used, but it can also be set to any convenient reference value for a normalization required.

In order to display the pixels' values after a processing in a logarithmic b-scale, the following backward conversion is used:

$$l = t^{b_p + B_M^{max}},$$

where $B_M^{max}$ is a dynamic range of a displaying monitor in the B-scale.

The exposure change (3.2) produces a change in the pixel's visual brightness on a reproduction device, such as a monitor.

In a logarithmic B-scale, the exposure change made by a camera and/or scene illumination can be expressed through the following equation:

$$B_p^{new} = \log_t l_p^{new} = \log_t(\beta l_p) = \log_t l_p + \log_t \beta = B_p + \Delta B_p$$

where the exposure change is:

$$\Delta B_P = \log_t \beta \quad (3.5)$$

So, here the $\Delta B_p$ represents an additive exposure change (and then—a visual brightness change) via β parameter.

From equations (3.2) and (3.5), the total exposure change and correction can be expressed through a sum of its additive components:

$$\Delta B_p = \log_t \beta_0 + \log_t \beta_E + \log_t \beta_s$$

so it is denoted as:

$$\Delta B_p = \Delta B_P^C + \Delta B_P^E + \Delta B_P^S \quad (3.6)$$

where:

$$\Delta B_p^c = \log_t \beta_c \quad \Delta B_p^\epsilon = \log_t \beta_\epsilon \quad \Delta B_p^s = \log_t \beta_s$$

Thus, any modification/correction of pixel brightness can be performed as an exposure change ΔB, where the ΔB value (3.5) can be obtained from any of the basic components (3.6):

$\Delta B_p^s$—scene illumination change (i.e. using flashlights),
$\Delta B_p^\epsilon$—camera exposure change (time, gain, aperture),
$\Delta B_p^c$—mathematical "exposure correction".

For example, if the exposure changes $\Delta B_p^s$ and $\Delta B_p^\epsilon$ produce insufficient visual brightness of a pixel on a reproduction device, then some additional correction of the pixel's exposure can be performed "mathematically" using $\Delta B_p^c$.

Since any ΔB value is additive, the following equations are also true for the b-scale:

$$b_{new} = b_p + \Delta b_p \quad (3.7)$$

$$\Delta b_p = \Delta b_p^c + \Delta b_p^\epsilon + \Delta b_p^s$$

From here, a pixel's value modification is defined in terms of "exposure values": $b_p$ is an exposure value of a pixel, and $\Delta b_p$ is an exposure change of the pixel.

In order to transform pixels' brightness values from one range to another (i.e. HDR-to-LDR range transform—making all pixels from HDR image viewable on an LDR reproduction device), a tone mapping operation is used. From its definition, the tone mapping actually performs an exposure range compression or expansion.

The tone mapping operation is defined as a mapping of $b_p$-values from a source b-range to a target b-range. The mapping operation is being performed through an additive function:

$$\Delta b = \Delta b(x, y, b)$$

which performs an additive exposure correction of a pixel at (x,y)-coordinates in the image as:

$$b_{new} = b_p + \Delta b(x, y, b_p) \quad (3.8)$$

$$b_p = b_p(x, y)$$

The function is represented in the same components as (3.7):

$$\Delta b_p(x,y,b_p) = \Delta b_p^s(x,y,b_p) + \Delta b_p^\epsilon(x,y,b_p) + \Delta b_p^c(x,y,b_p)$$

To build a "naturally working" tone mapping function, the tone mapping should work similarly to a human eye local adaptation; it should help to visualize dark areas of the image making them brighter, while keeping the brightest areas observable. This human eye ability (local adaptation) is well approximated by a Gamma function in a linear (light energy) scale. When a low dynamic range reproduction device is used to display an image, then an additional gamma correction is applied to all pixels in the image:

$$G_P(I_P) A * I_P^{max} \left(\frac{a I_P}{I_P^{max}}\right)^{\frac{1}{\gamma}}$$

Here $G_p(l_p)$ performs exposure range compression in terms of exposure compensation, which "helps" the human eye to observe image pixels, whose values $l_p$ are out of a dynamic range of the reproduction device. The γ-correction parameter allows observing darker areas of the image, while keeping the brightest elements. The a parameter performs a rescaling/amplification of an input pixel's value (or exposure). The A parameter can be considered as an output luminance rescaling/amplification factor for a reproduction device.

In a logarithmic B-scale, the gamma correction is simply a linear function:

$$B_G =$$

$$\log_t G_P(I_P) = \log_t \left[ A * I_P^{max} \left(\frac{a I_P}{I_P^{max}}\right)^{\frac{1}{\gamma}} \right] = \Delta b_{out} + B_P^{max} + \frac{1}{\gamma}(B_P + \Delta b_{in} - B_P^{max})$$

where:

$$\Delta b_{out} = \log_t A, \Delta b_{in} = \log_t \alpha.$$

When normalized to a b-scale (3.4), the equation above is even simpler:

$$b_G = \frac{1}{\gamma}(b_P + \Delta b_{in}) + \Delta b_{out}$$

As it can be seen from the last two equations, the gamma-function performs a linear compression/expansion in the logarithmic b-scale (or B-scale) by means of a compression factor $L/\gamma$. The function also performs an input additive exposure correction of a pixel by $\Delta b_{in}$ value and an output pixel exposure (luminance) correction by means of $\Delta b_{out}$ value.

This operation can be expressed through an additive exposure correction (3.8). Note:

$$\rho := 1 - \frac{1}{\gamma}$$

so, the basic gamma-like additive exposure correction for any pixel is:

$$\Delta b(b_p) = \Delta b_{in} - \rho(b_p + \Delta b_{in}) + \Delta b_{out} \quad (3.9)$$

where:
$\Delta b_{in}$ performs a preliminary exposure correction of a pixel,
$\rho$ defines a dynamic range compression, it also works as a global contrast factor,
$\Delta b_{out}$ performs a final exposure correction of a pixel, and also works as an output luminance change.

Figure 3:
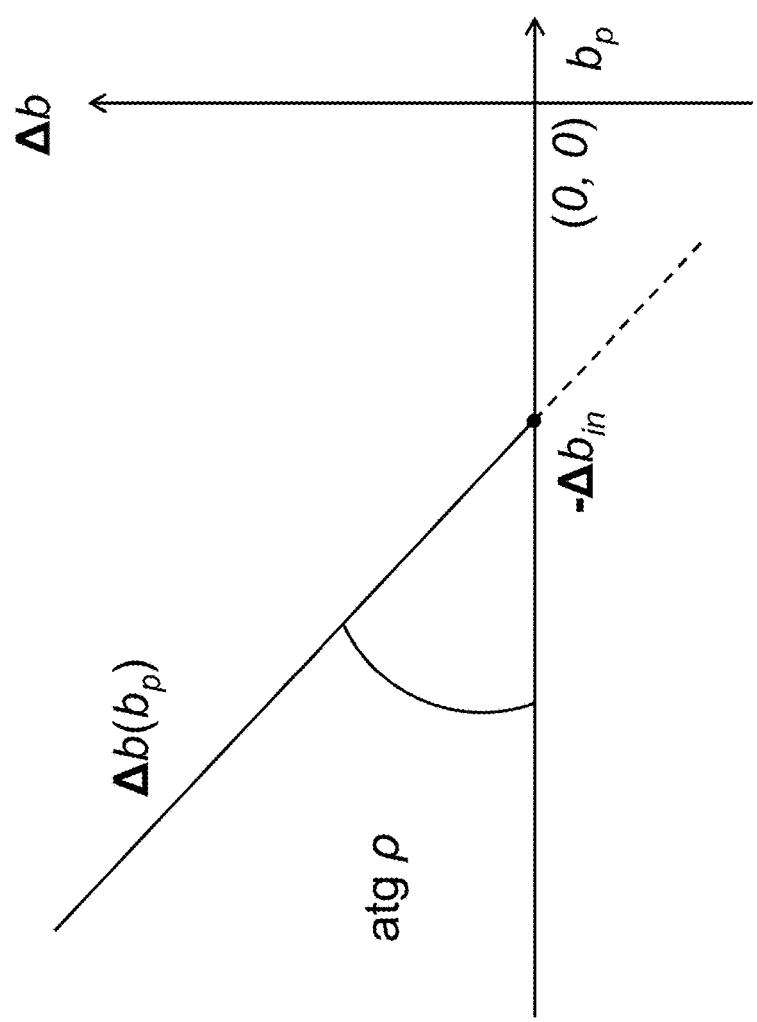
FIG. 3 is a drawing illustrating the additive gamma-like exposure correction function $\Delta b(b_p)$.

Refer to FIG. 3, which is a graph illustrating the additive gamma-like exposure correction function $\Delta b(b_p)$.

From the definition ($l_{LF}^{TM} = T(l_{LF})$ (2.1.1), the $\rho$ parameter of $\Delta b(b_p)$ function modifies a global contrast of the image. It applies a compression or extension of a total input range of pixel's exposures. On the other hand, it modifies exposure values similar to a local adaptation of a human eye.

In an embodiment of the present invention, the function (3.9) behavior (over its parameters) is considered as a local exposure compensation (LEC), which is used to compensate a local adaptation of a human eye, when an image is being viewed at a reproduction device.

$$\Delta b(b_p) = \Delta b_{in} - \rho(b_p + \Delta b_{in} - b_0) + \Delta b_{out} \quad (3.10)$$

Thus, when a maximal input exposure value max $b_p = -\Delta b_{in}$ is set, then the $\rho$, $b_0$ and $\Delta b_{out}$ parameters help to compensate local exposures for a better observation of dark areas of the image at a reproduction device. The compensation is performed in terms of human eye local adaptation.

Further, $\Delta b_{in}$ and $\Delta b_{out}$ are the same constants for all $b_p(x,y)$, and $\Delta b_{in}$ is set to have a normalization $b_{p,max} = 0$. In this case, the function (3.1) can look like $$\Delta b(b_p) = -\rho b_p + \Delta b_{out} \quad (3.11)$$

While the function (3.10) has an advantage in performing of local exposure compensation, its disadvantage is obvious from the Gamma-function definition: when adjusted to compress high-contrast scenes, it also compresses a native contrast of brighter details of the image, making them visually unnatural. On the other hand, if any contrast compression is prohibited or masked, the LEC does not make sense—nothing will be changed in the image after the "compensation".

Thus, the tone mapping function cannot consist of the function (3.10) only. A good balance between local exposure compensation and sufficient visual contrast should be kept. That's why the LEC function (exposure compensation) should be locally adaptive to a native contrast of the image details.

In an embodiment of the present the LEC local adaptation is considered as a reaction on a native micro-contrast of a detail.

Consider an elementary "detail" (known as "edge") through a single-step transition b; $b_1 \rightarrow b_2$ within a circle area C of radius r with a center o at a point of interest (POI), as shown in FIGS. 4 and 5.

Figure 4:
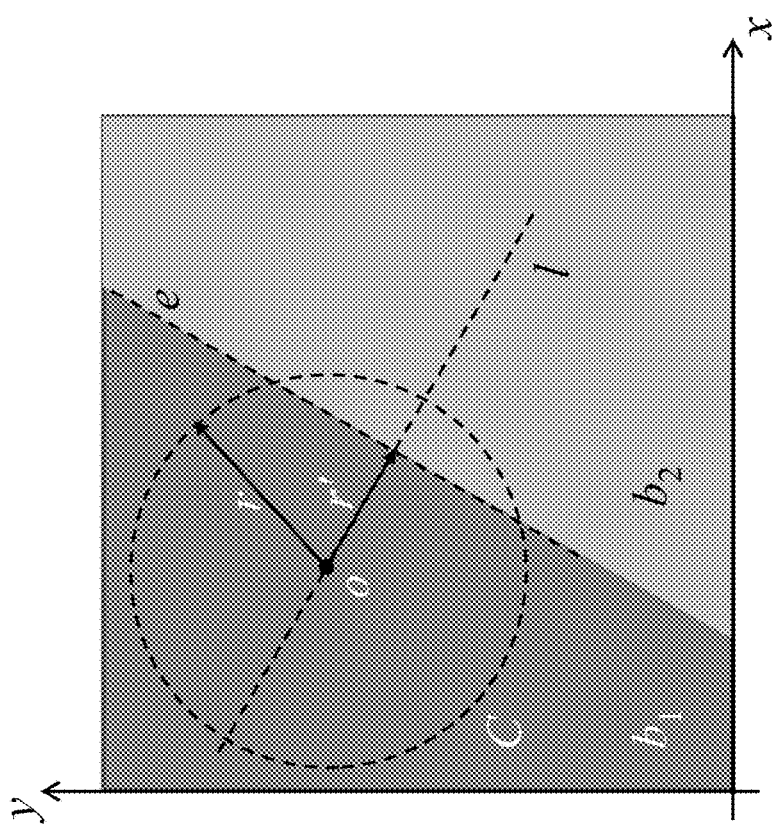
FIG. 4 is a drawing illustrating an elementary detail through a single-step transition b; $b_1 \rightarrow b_2$ within a circle area C of radius r with a center o at a point of interest (POI)
Figure 5:
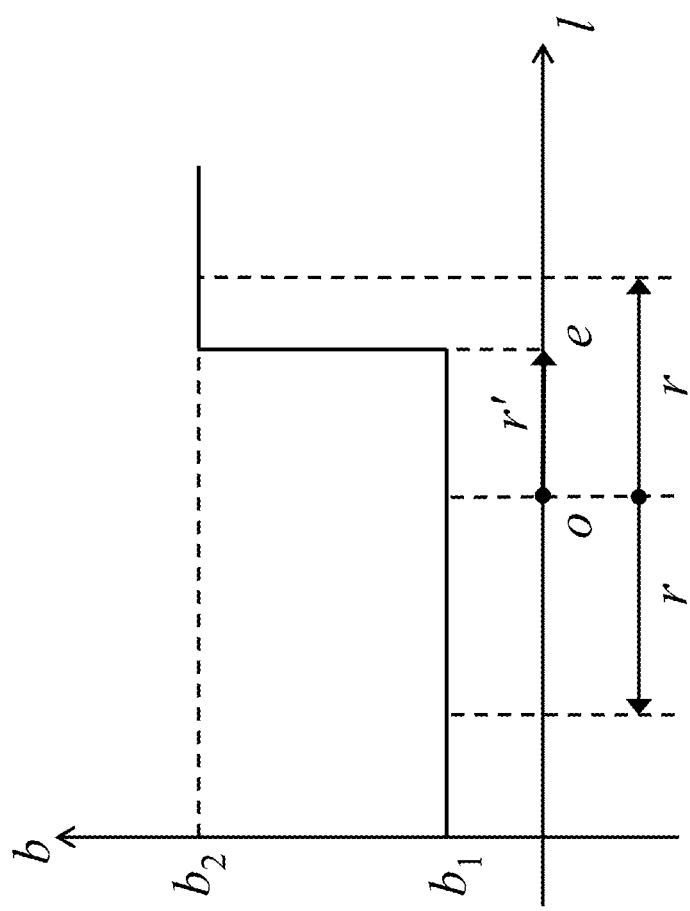
FIG. 5 is a drawing illustrating the $b_1$-$b_2$ transition along a cross-section line 1 drawn in FIG. 4.

FIG. 5 shows the $b_1 \rightarrow b_2$ transition along a cross-section line l drawn in FIG. 4. The line l is perpendicular to the transition edge e. The vector r' is in the direction of l.

In an embodiment the native micro-contrast is defined through a local exposure deviation of the value $b_p$ at the point o from an average value $\bar{b}_r$ calculated over all b-values within the C area as:

$$D_r(b_p) = b_p - \bar{b}_r$$

For example, for the point o shown in FIG. 4 $b_p = b_1$ is obtained. The maximal value of $D_r(b_p)$ can be found near $r^o \approx 0$.

Since the point o has coordinates (x,y), $$\bar{b}_r = \bar{b}_r(x,y)$$

The LEC function (3.10) is made locally adaptive through a local modification of the compression factor $\rho$. In order to keep or amplify a micro-contrast $D_r(b_p)$ of a detail, the slope of the LEC function (defined by $\rho = \rho_0$ parameter) should be locally decreased $\rho = \mu_{local} < \rho_0$ within the C area, if any local exposure deviation $D_r(b_p)$ in the area is nonzero.

Figure 6:
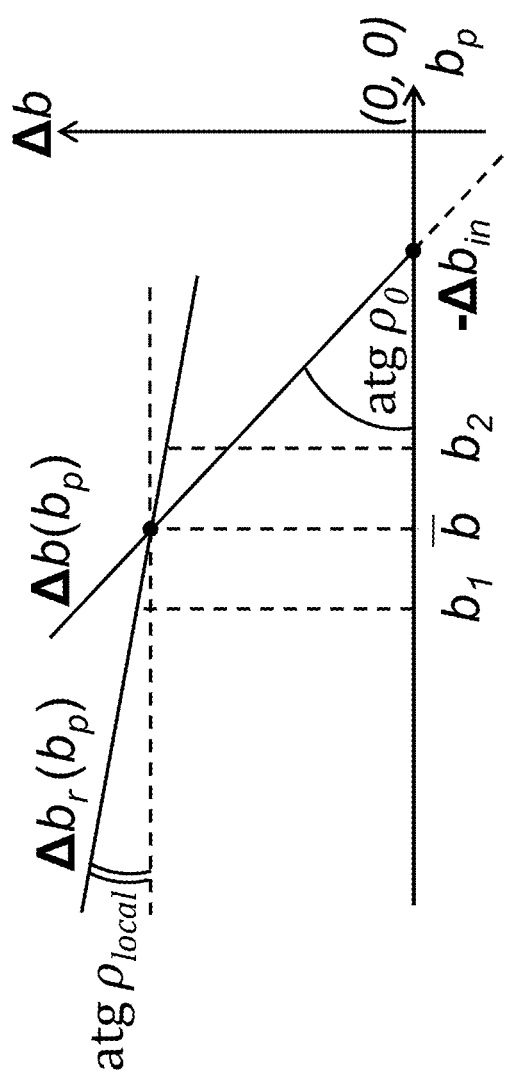
FIG. 6 is a drawing illustrating the single-step transition of the local LEC change (near $r^o \approx 0$)

For the single-step transition the proposed local LEC change (near $r^o \approx 0$) is represented in FIG. 6.

In accordance with FIG. 6 and equation (3.11), the locally modified LEC becomes dependent on the r and then can be written as follows:

$$\Delta b_r(b_p) = -\rho_{local} D_r(b_p) - \rho_0 \bar{b}_r + \Delta b_{out} \quad (3.12)$$

where $$b_p = b_p(x,y) \bar{b}_r = \bar{b}_r(x,y)$$

The function (3.12) has the following properties over the $\rho_{local}$ parameter:

when $\rho_{local} = 0$, a micro-contrast preservation results. This is the basic case—no change with the micro-contrast happens within the C area. Thus, when the exposure correction $\Delta b_p(b_p)$ is added to initial image $b_p$:

$$b_{out} = b_p + \Delta b_p(b_p) = b_p - \rho_0 \bar{b}_r + \Delta b_{out}$$

It can be written: $b_p = (b_p - \bar{b}_r) + b_p$, so $$b_{out} = (b_p - \bar{b}_r) + (1 - \rho_0)b_p + \Delta b_{out} = D_r(b_p) + (1 - \rho_0)\bar{b}_r + \Delta b_{out}$$

As can be seen, $\rho_0$ does not change the micro-contrast in the logarithmic scale.

For other $\rho_{local}$:
$\rho_{local} > \rho_0$: micro-contrast suppression;
$\rho_{local} = \rho_0$: the equation (3.12) turns into (3.11)—no micro-contrast amplification; just gamma-compression.
$\rho_{local} < \rho_0$: micro-contrast amplification;
Parameter $\rho_0$ works as a global gamma-compression parameter.

The following details micro-contrast to local contrast.
If a Gaussian-weighted averaging (with dispersion $r^2$) is used to calculate $\bar{b}_r$ $$\bar{b}_r(x,y) = \frac{1}{2\pi r^2} \int_{-\infty}^{+\infty} \int_{-\infty}^{+\infty} b_P(x-x' \cdot y - y') e^{-\frac{x'^2+y'^2}{2r^2}} dx' dy' \qquad (3.13)$$

$$\bar{b}_{r=0}(x,y) := b_P(x,y)$$

The equation (3.12) becomes working in the same way as the approach described in regard to equations 2.3, 2.4, 2.5, relating to a human vision system. Then, the image is being separated into two layers: G ("global contrast" part) and L ("local contrast" part):

$$b_p(x,y) = b_p^L(x,y) + b_p^G(x,y)$$

$$b_r^G(x,y) = \bar{b}_r(x,y)$$

and $\bar{b}_r(x,y)$ is calculated from (3.13).

Here, details of characteristic sizes about or less than the value r (spatial frequencies higher than ~1/r) are in the layer $b_p^L(x,y)$ which incorporates the "local contrast" data (analogous to the "micro-contrast" $D_s(b_p)$ described above)

$$b_p^L(x,y) = b_p(x,y) - b_p^G(x,y)$$

Then, the equation (3.12) can be rewritten in the following way $$\Delta b_p(b_p) = -\rho_{local} b_p^L - \rho_{local} b_r^G + \Delta b_{out} \qquad (3.14)$$

where $\rho_{local}$ operates the global contrast correction (same as $\rho_0$), while $\rho_{local}$ operates the local contrast of the image details. The equation (3.14) has the same properties as (3.12):

$\rho_{local}=0$: local contrast preservation;
$\rho_{local}>\rho_{global}$: local contrast suppression;
$\rho_{local}=\rho_{global}$: no local contrast amplification, just gamma-compression;
$\rho_{local}<\rho_{global}$: local contrast amplification.

The equation (3.14) may still have the same disadvantages of the approach described regarding equations 2.3, 2.4, 2.5, including "halo" artifacts.

In order to resolve insufficient local contrast in the Gamma compression operation and eliminate the "halo" artifacts problems, an approach is utilized where HDR images are processed not only by human eye related calculations (3.14), but also for human eye natural-like perception, "like artists create paintings". To achieve this Locally Adaptive Tone Mapping (LATM) is utilized, where:

1. Any local contrast modification being performed at a point (x,y) should work as an additive contrast compensation applied to the native local contrast deviation $b_r^L$ found at this point in the original image $b_p$.
2. Resulting local contrast deviations should be as close as possible to the original deviations $b_r^L$, while all $b_r^L$ values are still mapped into a limited available contrast range of a reproduction device (or reflection density of paints, inks and so on).
3. Resulting local contrast deviations should be visually invariant to any distance of their observation, thus the additive local contrast compensation should be processed for each available spatial frequency (~1/r) independently.

From here, the $\rho_{local}$ factor should be locally adaptive to native local contrast (NLC) deviations $b_r^L$ at each point of (x, y) in a relation to r $$\rho_{local} = \rho_{local}(x,y,r)$$

Solution for statement 1 above. Additive local contrast compensation is already expressed in the equation (3.14) as a "portion" of an original deviation $b_r^L$ as: $-\rho_{local} b_p^L$.

For the sake of operational convenience, the local contrast modification parameter $p_{local}$ is rewritten as:

$$\rho_{local} = \rho_L k_T^L$$

so, $$\rho_{local} b_p^L = \rho_L k_p^L b_p^L$$

where $k_p^L$ is being modulated at a point (x,y) by an original deviation $b_p^L$ at this point as $$k_p^L = k^L(x,y,r) = k^L(b_p^L(x,y))$$

and the $\rho_L$ parameter is a common scaling factor, which does not depend on $b_p^L$ and (x,y) coordinates.

The additive local contrast compensation is defined from the following equation $$b_{npaint}^L = b_p^L - k_p^L b_p^L$$

$$0 < k_p^L \le 1$$

where $b_{npaint}^L$ denotes a resulting local contrast deviation, which is supposed to be "painted" at a reproduction device.

Solution for statement 2 above. To define an adaptive behavior of $k_p^L$ an approximation model is used, which is described by the following "balanced contrast" relationship $$\frac{b_{r,paint}^L}{b_{max}^L} = \frac{b_r^L - b_{r,paint}^L}{|b_r^L|}$$

$$b_{max}^L > 0$$

$$0 \le |b_{r,paint}^L| \le b_{max}^L$$

Here, $b_{max}^L$ value is a maximal available contrast range at a reproduction device.

From statements 1 and 2 above:

$$b_{r,paint}^L = \frac{b_r^L}{1 + \frac{|b_r^L|}{b_{max}^L}} \qquad (3.15)$$

Then $$k_r^L = \frac{h_s |b_r^L|}{1 + h_s |b_r^L|} \qquad (3.16)$$

where $h_s$ can be considered a halo suppression coefficient $$h_s = \frac{1}{b_{max}^L}$$

The halo suppression coefficient $h_s$ is a positive $h_s \ge 0$ constant, which does not depend on and can be operated by a user.

Equation (3.16) with statement 1 defines a locally adapted local contrast layer $$b_r^{LA} = k_r^L b_r^L = \frac{h_s |b_r^L|}{1 + h_s |b_r^L|} b_r^L \qquad (3.17)$$

Using the $b_p^{Lk}$ layer from (3.17) in equation (3.14), the global contrast layer $b_p^G$ is replaced with a locally adapted global contrast layer $b_p^{Gk}$, which is defined as $$b_p^{Gk} = b_p - b_p^{LA}$$

Then, the tone-mapping function (3.14) is replaced with its locally adaptive representation $$\Delta b_p^A(b_p) = -\rho_L b_r^{LA} - \rho_G b_p^{GA} + \Delta b_{out} \quad (3.18)$$

where $\rho_G = \rho_{global}$.

Solution for statement 3 above. Additive local contrast compensation (3.17) calculated at the same point (x,y) for a certain r can give different visual contrast results for different observation distances of the image $b_{near}$. In a particular case shown in FIG. 4, equation (3.17) is considered as a dependence of $b_r^{LA}$ calculated for a certain r at the point o situated at a distance r' from a transition edge e: visual luminance distribution along l direction will depend on its observation distance. To make details (luminance transitions) of the output image visually less dependent on a distance of their observation, an effective locally adaptive tone mapping function (LATM) is built as a superposition of different responses of $b_p^{Lk}$ at (x,y), over all available r. This can be done through an integral of (3.18) over r parameter $$\Delta b_A(b_p) = \frac{1}{R_{max}} \int_0^{R_{max}} \Delta b_r^A(b_P) dr. \quad (3.191)$$

The $R_{max}$ sets the maximal available value r for the given image size; it can be a user-defined value in the algorithm applications.

The equation (3.19) can be rewritten as $$\Delta b_A(b_p) = -\rho_L b_A^L - \rho_0 b_A^0 + \Delta b_{out} \quad (3.20)$$

where $$b_A^L = b_A^L(x,y) = \frac{1}{R_{max}} \int_0^{R_{max}} b_r^{LA}(x,y) dr$$

$$b_A^G = b_A^G(x,y) = b_P(x,y) - b_A^L(x,y)$$

$$b_r^{LA}(x,y) = \frac{h_s |b_r^L(x,y)|}{1 + h_s |b_r^L(x,y)|} b_r^L(x,y)$$

$$h_s = \frac{1}{b_{max}^L}$$

$$b_r^L(x,y) = b_P(x,y) - \hat{b}_r(x,y)$$

The $\bar{b}_r(x,y)$ layer can be calculated from (3.13) or using some other suitable low-pass filtering.

Parameters $\Delta b_{out}$, $b_{max}^L$, $\rho_L$ and $\rho_G$ are user-defined constants, which don't depend on (x,y,r). Parameters $\rho_L$ and $\rho_G$ are intended for manual adjustments of local and global contrast corrections accordingly, $b_{max}^L$ is a contrast limit for a reproduction device and $\Delta b_{out}$ is a total output exposure offset.

Following is a description of a hardware implementation of the high dynamic range imaging of the present invention in an HDR video device.

For the input data form, the video stream consists of consecutive images (frames), produced by an image sensor or a set of image sensors.

For the given implementation of the HDR algorithms, it is supposed that the frames can flow as either a single video stream of consecutive frames or multiple parallel video streams.

For the proposed HDR processing, which is the number of the frame is not important. The only parameter here is an exposure setting $$\varepsilon = \frac{\alpha \tau}{f^2}$$

where $\tau$ is an exposure time, $\alpha$ is a gain, f relates to an aperture.

For input data preparation, let "I" represent an internal m-bit color pixel data produced by a digital output from a Color Image Sensor (CIS). Value l=l(x,y) will be assumed here as a linear brightness representation of the incident light power in the pixel, where (x, y) are coordinates of the pixel in the image. The pixel data are in the range of $[0, l_0]$, where $l_0$ is a maximal possible positive value. For m-bit data $$l_0 = 2^m - 1$$

The merging algorithm is intended for mosaicked RGGB images, so there will be four kinds of "color" pixels $l_r$, $l_{g1}$, $l_{g2}$ and $l_b$, depending on the (x, y) position. Since the merging procedure merges the images pixel-by-pixel regardless of neighboring colors, the brightness of each pixel will be processed independently. Thus, the input for the merging procedure will be in the form of just l=l(x,y), without the color filters notation.

The merging procedure uses a logarithmic (by 2-basis) representation of the pixel brightness in terms of exposure values $$b_{in} = \log_2 I - \log_2 I_0 \quad (4.1)$$

In (4.1) the $B_{in}$ is "normalized" to be always less than "0" for any 1.

Usually, the transfer function of pixel-to-ADC conversion is not linear, so a preliminary linearization is preferable to be done before calculations. Nevertheless, some dominating gamma-like nonlinearity is being compensated by the following calculation $$b_{corr} = C_{rs} * (b_{in} + b_{ref}) - b_{ref} \quad (4.2).$$

The calculation (4.2) has a constant reference value $b_{ref}$ and de-gamma coefficient $C_{rs}$. Both values do not depend on (x,y).

Exposure setting for each frame (so called 'bracket') will be defined here through an EV offset $EV_{offs}^{(n)}$ for each image, where n is a number of a bracket (exposure setting)

$$EV_{offs}^{(n)} = \log_2 \frac{\varepsilon_0}{\varepsilon_n}$$

where $\epsilon_0$ is a <<reference>> exposure. Before the merging procedure, the image is recalculated in accordance with its appropriate exposure setting as $$b_{LDR}(x,y) = b_{corr}(x,y) + EV_{offs}^{(n)} \quad (4.3)$$

For the input parameters of the merging algorithm:
1. $b_{hl}$—threshold level for highlights in LDR frame.
2. $EV_{offs}^{(n)}$—offset for the given LDR frame.
3. $b_{HR}$—maximal dynamic range of HDR image in EV values; $b_{HR} > 0$
4. Q—ghost suppression factor; $Q > 0$
5. $\alpha_{mix}$—mixing parameter; $0 \leq \alpha_{mix} \leq 1$.

For memory allocations:
1. $b_{LDR} = b_{LDR}(x,y)$ is a buffer for the input LDR image obtained in the Input Data Preparation section.
2. $b_{HDR} = b_{HDR}(x,y)$ is a buffer for the resulting HDR image of the same size (in pixels) as the input LDR image.

3. $G_{kernel}$ is a Gaussian distributed 2D-kernel (coefficients of a low-pass Gaussian filter).

The merging algorithm merges pixels of an image $b_{LDR}$(x,y) with the given $EV_{offs}^{(n)}$ into an image $b_{HDR}$(x,y) by the following way:

The buffer $b_{HDR}$(x,y) is initialized with the first frame n=0 of the bracketing series.

Then, for other brackets (n>0):

1. Finding absolute differences $$\Delta b_{LH}(x,y)=|b_{LDR}(x,y)-b_{HDR}(x,y)|$$

2. Finding reference values
variant 1:

$$\Delta b_{ref}(x,y)=Q*\log_2(1+2^{-b_{LDR}(x,y)-b_{HR}})$$

variant 2:

$$\Delta b_{ref} = Q * \left(\frac{b_{LDR}(x, y)}{b_{HR}}\right)^2$$

3. Creating a merging mask $$M_{mid}(x, y) = \begin{cases} 1, & \text{if } \Delta b_{LH}(x, y) \leq \Delta b_{ref}(x, y) \\ 0, & \text{if } \Delta b_{LH}(x, y) > \Delta b_{ref}(x, y) \end{cases}$$

$$M_{hl}(x, y) = \begin{cases} 1, & \text{if } b_{LDR}(x, y) \leq b_w \\ 0, & \text{if } b_{LDR}(x, y) > b_w \end{cases}$$

$$b_w = b_{hl} + EV_{offs}^{(n)}$$

$$M_{dg}(x, y) = M_{mid}(x, y) * M_{hl}(x, y)$$

4. Making an effective merging mask
Variant 1. % Direct merging with a mixing of pixel's values $$M_{eff}=M_{hl}(x,y)$$

Variant 2.% Merging with a de-ghost operation $$M_{eff}=M_{dg}(x,y)$$

5. Applying a low-pass filtering $L(M|G_{kernel})$ onto the whole effective mask to suppress color transition artifacts in motion areas $$M_{merge}=\alpha_{mix}*L(M_{eff}|G_{kernel})$$

6. Updating $b_{HDR}$(x,y) with the frame $b_{LDR}$(x,y)

$$b_{HDR}(x,y)=M_{merge}(x,y)*b_{LDR}(x,y)+(1-M_{merge}(x,y))*b_{HDR}(x,y)$$

7. Repeating operations 1-6 for all remaining brackets (frames).

For tone-mapping, the tone-mapping algorithm is intended for Bayer-mosaicked images, represented in a logarithmic scale $b_{HDR}$(x,y). Minimal colored detail is supposed to occupy 3×3 of RGGB pixels. In order to keep the detail's color, the $b_{HDR}$(x,y) image is separated into a <<brightness>> component:

$$b_{br}=b_{br}(x,y)$$

and <<color>> component $$\delta b_{col}=\delta b_{col}(x,y)$$

so $$b_{HDR}(x,y)=b_{br}(x,y)+\delta b_{col}(x,y)$$

where col denotes an appropriate pixel's primary color r, g1, g2 or b at (x,y) position.

The first component contains just exposure brightness values of the image details, the second one—colors of the details. Ideally, the $\delta b_{col}$ color component and the brightness $b_{br}$ component should not depend on each other.

After the separation, tone-mapping calculations are being performed on $b_{br}$ only.

To achieve this, the brightness $b_{br}$ is separated into a low details (LD) component $b_{br}^{LD}$ and a high details (HD) component $b_{br}^{HD}$, so $$b_{br}(x,y)=b_{br}^{LD}(x,y)+b_{br}^{HD}(x,y).$$

At each pixel coordinate (x,y) the tone mapping will be performed by an operation $$b_{br}^{TM}=F_{TM}(b_{br}^{LD},b_{br}^{HD})$$

The tone-mapping function $F_{TM}$ at each pixel coordinate (x,y) is defined as:

$$F_{TM}(b_{br}^{LD},b_{br}^{HD})=b_E+b_{br}^{LDeff}+\rho_G(b_W-b_{br}^{LDeff})+\rho_L b_{br}^{HDeff}$$

where $$b_{br}^{LDeff}(x,y)=b_{br}(x,y)-b_{br}^{HDeff}(x,y)$$

obtained from a locally adaptive processing $$b_{br}^{HDeff}(x, y) = T * (b_{br}(x, y) - b_{br}^{LD}(x, y))$$

$$T = \begin{cases} 0 & \text{if } T_r < 0 \\ T_r, & \text{if } 0 \leq T_r \leq 1 \\ 1, & \text{if } T_r > 1 \end{cases}$$

$$T_r = \frac{C_{slope} * (\rho_G * (b_W - b_{br}(x, y) + C_{shift}) - b_E)}{b_{monitor}}$$

Then the final tone-mapped color image is obtained as $$b_{TM}(x,y)=b_{br}^{TM}(x,y)+\delta b_{col}(x,y)$$

where $$\delta b_{col}(x,y)=b_{HDR}(x,y)-b_{br}(x,y)$$

Parameters of the functions above have the following meanings:

$b_W$—user-defined white point of the $b_{br}$ image
$b_E$—total exposure brightness of the $b^{TM}$ image
$b_{monitor}$—target dynamic range of a reproduction device
$\rho_G$—Gamma-like global contrast
$\rho_L$—Local contrast modification of the image
$C_{slope}$—sensitivity of locally adaptive processing
$C_{shift}$—dead-zone for locally adaptive processing Brightness component is calculated from $b_{HDR}$(x,y) through a Gaussian low-pass filtering using a Gaussian 2D-kernel $G_{br}$ $$b_{br}=L(b_{HDR}|G_{br})$$

Standard deviation of the 2D-kernel distribution should cover at least 3×3 block of RGGB pixels, which are supposed to detect a color of the minimal detail.

Figure 7:
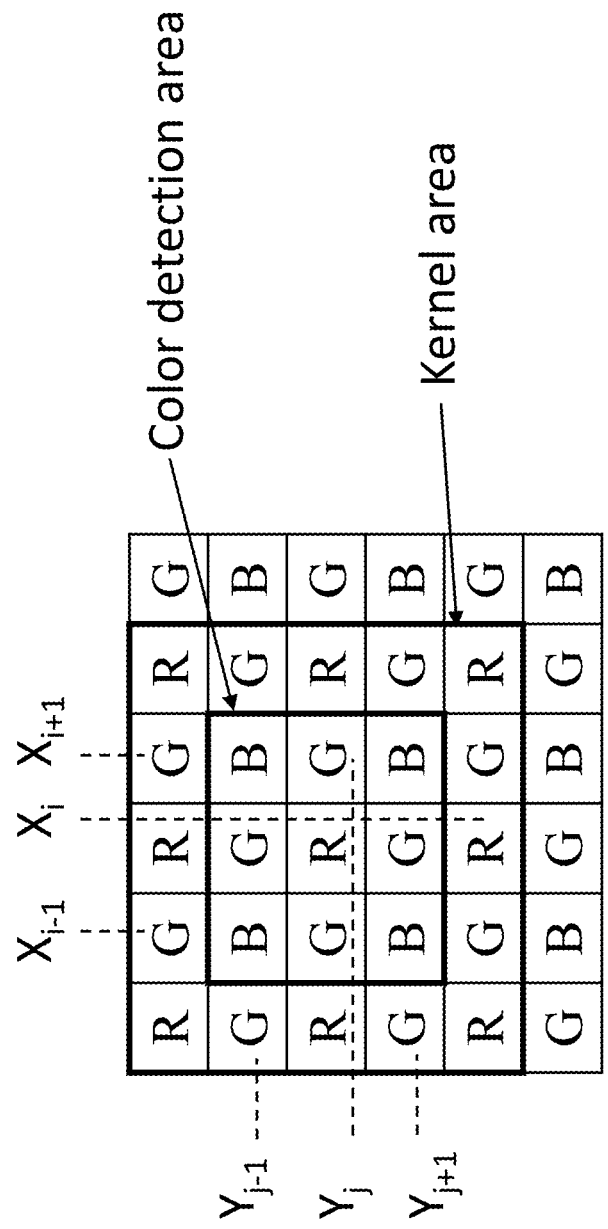
FIG. 7 is a drawing illustrating a 5×5 kernel example of a 2D-kernel distribution of RGGB pixels.

Refer to FIG. 7, which is a drawing illustrating a 5×5 kernel example of a 2D-kernel distribution of RGGB pixels.

The low-details component of the HDR image is calculated from the $b_{br}$ through the following operations:
Input parameters:
N—number of integration loops
Memory allocations:

$$G_{rs} = \begin{bmatrix} 1 & 2 & 1 \\ 2 & 4 & 2 \\ 1 & 2 & 1 \end{bmatrix}$$

—resampling low-pass filtering 2D-kernel
$P_{av}$—memory buffer of the HDR image size
$P_{LD}$—memory buffer of the HDR image size
$W_{count}$—integration counter
$P_{av}^{rB}$—memory buffer of the HDR image size
Process:
1. Initializing buffers $$P_{av}(x,y)=b_{br}(x,y)$$

$$P_{LF}(x,y)=b_{br}(x,y)$$

$$W_{count}:=1$$

Then repeating N loops of the following operations:
2. Set parameters
$k_{step}=2^n$//Find a resampling step for the given rescaling level; n—number of the loop
$x_{align}=k_{step}-1$//Alignment parameter
$y_{align}=-1$//Alignment parameter
3. Finding low-pass $P_{av}$ image for the given $P_{step}$:

$$P_{av}^F = \frac{1}{16} L(P_{av} | G_{rs})$$

//Apply a low-pass filtering.
4. Subsample the filtered image $P_{av}^F$ within available $P_{av}^F$ size $$P_{av}^{sub}(x',y')=P_{av}^F(k_{step}*x'+x_{align},k_{step}*y'+y_{align})$$

5. Get low-pass filtered HDR image $P_{av}^{rs}$ by a rescaling of $P_{av}^{sub}$ back to the HDR image size using any available rescaling method.
6. Integrate the resulting $P_{av}^{rs}$ into effective $P_{LD}$ low-details image $$P_{LD}(x,y)=P_{LD}(x,y)+P_{av}^{rs}(x,y)$$

7. Incrementing integration counter $$W_{count}=W_{count}+1$$

8. Creating a new $P_{av}$ rescaled image of smaller size within available $P_{av}^F$ size $$P_{av}(\tilde{x},\tilde{y})=P_{av}^F(2\tilde{x}+1,2\tilde{y}+1)$$

9. Return to the point 2, if n≠N, otherwise normalize the result $$b_{br}^{LD}(x,y) = \frac{P_{LD}(x,y)}{W_{count}}$$

Conversion of any output image $b_{out}$ (like $b_{HDR}$ or $b_{TM}$) from EV values back to a linear representation can be processed as $$I_{out}=2^{b_{out}+D_{monitor}}$$

where $b_{monitor}$ is a dynamic range of a reproduction device, or bit-width of the linear image representation.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:
1. A high dynamic resolution video processing method comprising:
 passing light through a Bayer filter;
 capturing the light by an image capture device to create a Bayer-mosaic image;
 performing merging techniques on the Bayer-mosaic image, the merging techniques comprising a full-reset merging mode and a low dynamic range-updated merging mode;
 performing tone mapping techniques on the Bayer-mosaic image;
 converting results of the merging techniques and the tone mapping techniques to red green blue (RGB) data; and
 outputting a high dynamic range image from the red green blue data;
 wherein, during merging techniques, four frames of different exposures are used per high dynamic range capture; and
 wherein the low dynamic range-updated merging mode comprises updating a previous high dynamic range frame with a new low dynamic range frame data to obtain a new high dynamic range frame.

2. A high dynamic resolution video processing method comprising:
 passing light through a Bayer filter;
 capturing the light by an image capture device to create a Bayer-mosaic image;
 performing merging techniques on the Bayer-mosaic image, the merging techniques comprising a full-reset merging mode and a low dynamic range-updated merging mode;
 performing tone mapping techniques on the Bayer-mosaic image;
 converting results of the merging techniques and the tone mapping techniques to red green blue (RGB) data; and
 outputting a high dynamic range image from the red green blue data;
wherein, during merging techniques, four frames of different exposures are used per high dynamic range capture; and
 wherein the low dynamic range-updated merging mode comprises updating a high dynamic range frame with low dynamic range frames at a frame rate of the low dynamic range frames.

* * * * *